US009830870B2

(12) United States Patent
Chen et al.

(10) Patent No.: US 9,830,870 B2
(45) Date of Patent: Nov. 28, 2017

(54) DRIVING METHOD FOR LIQUID CRYSTAL DISPLAY PANEL

(71) Applicant: SHENZHEN CHINA STAR OPTOELECTRONICS TECHNOLOGY CO. LTD., Guangdong (CN)

(72) Inventors: Yuyeh Chen, Guangdong (CN); Wenqin Zhao, Guangdong (CN)

(73) Assignee: SHENZHEN CHINA STAR OPTOELECTRONICS TECHNOLOGY CO. LTD., Guangdong (CN)

( * ) Notice: Subject to any disclaimer, the term of this patent is extended or adjusted under 35 U.S.C. 154(b) by 117 days.

(21) Appl. No.: 14/777,749

(22) PCT Filed: Jun. 4, 2015

(86) PCT No.: PCT/CN2015/080746
§ 371 (c)(1),
(2) Date: Sep. 17, 2015

(87) PCT Pub. No.: WO2016/176888
PCT Pub. Date: Nov. 10, 2016

(65) Prior Publication Data

US 2016/0329009 A1 Nov. 10, 2016

(30) Foreign Application Priority Data

May 5, 2015 (CN) .......................... 2015 1 0225089

(51) Int. Cl.
*G06F 3/038* (2013.01)
*G09G 5/00* (2006.01)
(Continued)

(52) U.S. Cl.
CPC ... *G09G 3/3611* (2013.01); *G09G 2310/0213* (2013.01); *G09G 2310/0218* (2013.01); *G09G 2330/021* (2013.01)

(58) Field of Classification Search
CPC ......... G09G 3/3233; G09G 2300/0819; G09G 2320/043; G09G 2300/0842
See application file for complete search history.

(56) References Cited

U.S. PATENT DOCUMENTS 8,619,019 B2 12/2013 Lee et al.
2007/0139356 A1* 6/2007 Lee ..................... G09G 3/3659 345/103
(Continued)

FOREIGN PATENT DOCUMENTS

CN 1983374 A 6/2007
CN 101996603 A 3/2011
(Continued)

*Primary Examiner* — Nan-Ying Yang
(74) *Attorney, Agent, or Firm* — Mark M. Friedman

(57) ABSTRACT

A driving method for a liquid crystal display panel is provided, and includes grouping all the scan lines into a plurality of scan line groups, calculating driving voltage differences of the pixel units corresponding to the scan lines of each of the scan line groups in different scanning sequences, determining the scanning sequence of each of the scan line groups based upon the driving voltage differences and a preset voltage difference, and performing a scan driving on the scan lines of the corresponding scan line group by using the determined scanning sequence.

18 Claims, 4 Drawing Sheets

(51) Int. Cl.
*G09G 3/36* (2006.01)
*G09G 5/10* (2006.01)

(56) References Cited

U.S. PATENT DOCUMENTS

| | | | | |
|---|---|---|---|---|
| 2010/0045652 | A1 | 2/2010 | Yamashita et al. | |
| 2010/0315402 | A1* | 12/2010 | Hashimoto .......... | G09G 3/3614<br>345/211 |
| 2012/0092307 | A1 | 4/2012 | Guo et al. | |
| 2016/0365046 | A1 | 12/2016 | Chen et al. | |
| 2016/0372064 | A1 | 12/2016 | Chen et al. | |

FOREIGN PATENT DOCUMENTS

| | | | |
|---|---|---|---|
| CN | 104391411 | A | 3/2015 |
| CN | 104505047 | A | 4/2015 |
| JP | 2011118086 | A | 6/2011 |

* cited by examiner

DRIVING METHOD FOR LIQUID CRYSTAL DISPLAY PANEL

FIELD OF THE INVENTION

The present invention relates to the field of liquid crystal displays, and particularly to a driving method for a liquid crystal display panel.

BACKGROUND OF THE INVENTION

In the current day of the information age, liquid crystal display devices have become important media for information transmission. Along with the increasing size of liquid crystal display panels, the power consumption of liquid crystal display panels has become the major cause of power consumption of liquid crystal displays. Thus, the designs for reducing the power consumption of liquid crystal display panels are increasingly important.

A conventional liquid crystal display panel generally includes data lines, scan lines, driver chips and pixel units. The data lines are used to transmit data signals for the corresponding pixel units. The scan lines are used to transmit scan signals for the corresponding pixel units. The driver chips are used to generate data signals and scan signals, and to drive the corresponding pixel units.

The conventional driving method for a liquid crystal display panel is generally to drive the pixel units through the data lines and the scan lines. Specifically, high electrical level signals are inputted into the pixel units in row A1 through the scan lines, and then data signals are inputted into the pixel units in row A1 through the data lines. Subsequently, high electrical level signals are inputted into the pixel units in row A2 (next to row A1) through the scan lines, and then data signals are inputted into the pixel units in row A2 through the data lines. If the voltage difference between the data signal corresponding to row A1 of the pixel unit and the data signal corresponding to row A2 of the pixel unit is great, the power consumption of the driver chip will be increased.

Therefore, it is necessary to provide a driving method for a liquid crystal display panel to solve the problem of the prior art.

SUMMARY OF THE INVENTION

An object of the present invention is to provide a low power-consuming driving method for a liquid crystal display panel to solve the technical problem of great power consumption in the conventional driving method for a liquid crystal display panel.

To solve this problem, the technical aspect of the present invention is as follows:

A driving method for a liquid crystal display panel is provided in the present invention, the liquid crystal display panel including:

- data lines for transmitting data signals;
- scan lines for transmitting scan signals;
- a driver chip for generating the data signals and the scan signals; and
- pixel units constituted by interlacing the data lines and the scan lines, and displaying an image through the data signals and the scan signals;
- the driving method comprising steps of:
  - grouping all the scan lines into a plurality of scan line groups, wherein each of the scan line groups includes four of the scan lines;

- calculating driving voltage differences of the pixel units corresponding to the scan lines of each of the scan line groups in different scanning sequences;
  - determining the scanning sequence of each of the scan line groups based upon the driving voltage differences of the pixel units of each of the scan line groups in the different scanning sequences and a preset voltage difference;
  - performing a scan driving on the scan lines of the corresponding scan line group by using the determined scanning sequence,
- wherein the step of calculating the driving voltage differences of the pixel units corresponding to the scan lines of each of the scan line groups in the different scanning sequences, comprises the steps of:
  - acquiring image gray levels of the data signals corresponding to all the pixel units of the image of a current frame;
  - calculating differences of the image gray levels between two adjacent ones of the data signals of the pixel units of each of the scan line groups in the different scanning sequences; and
  - calculating the driving voltage differences of the data signals of the pixel units in the different scanning sequences based upon a preset formula and the differences of the image gray levels.

In accordance with the driving method for the liquid crystal display panel in the present invention, the two adjacent ones of the data signals are two of the data signals sequentially inputted into the same data line based upon the scanning sequences.

In accordance with the driving method for the liquid crystal display panel in the present invention, the driving voltage differences of the data signals of the pixel units in the different scanning sequences are calculated based upon a maximum of the differences of the image gray levels and the preset formula.

In accordance with the driving method for the liquid crystal display panel in the present invention, the driving voltage differences of the data signals of the pixel units in the different scanning sequences are calculated based upon an average of the differences of the image gray levels and the preset formula.

In accordance with the driving method for the liquid crystal display panel in the present invention, the step of determining the scanning sequence of each of the scan line groups based upon the driving voltage differences of the pixel units of each of the scan line groups in the different scanning sequences and the preset voltage difference, comprises a step of:

- comparing the driving voltage difference with the preset voltage difference; and
- using the scanning sequence corresponding to the driving voltage difference as the scanning sequence of the scan line group if the driving voltage difference is less than the preset voltage difference.

In accordance with the driving method for the liquid crystal display panel in the present invention, the step of determining the scanning sequence of each of the scan line groups based upon the driving voltage differences of the pixel units of each of the scan line groups in the different scanning sequences and the preset voltage difference, comprises a step of:

- using a default scanning sequence as the scanning sequence of the scan line group if the driving voltage difference is greater than the preset voltage difference.

In accordance with the driving method for the liquid crystal display panel in the present invention, the default scanning sequence is the scan sequence from top to bottom or from bottom to top.

In accordance with the driving method for the liquid crystal display panel in the present invention, the default scanning sequence is the scanning sequence corresponding to a minimum of the driving voltage differences.

A driving method for a liquid crystal display panel is provided in the present invention, the liquid crystal display panel including:

data lines for transmitting data signals;

scan lines for transmitting scan signals;

a driver chip for generating the data signals and the scan signals; and pixel units constituted by interlacing the data lines and the scan lines, and displaying an image through the data signals and the scan signals;

the driving method comprising steps of:

grouping all the scan lines into a plurality of scan line groups, wherein each of the scan line groups includes at least three of the scan lines;

calculating driving voltage differences of the pixel units corresponding to the scan lines of each of the scan line groups in different scanning sequences;

determining the scanning sequence of each of the scan line groups based upon the driving voltage differences of the pixel units of each of the scan line groups in the different scanning sequences and a preset voltage difference;

performing a scan driving on the scan lines of the corresponding scan line group by using the determined scanning sequence.

In accordance with the driving method for the liquid crystal display panel in the present invention, the step of calculating the driving voltage differences of the pixel units corresponding to the scan lines of each of the scan line groups in the different scanning sequences, comprises the steps of:

acquiring image gray levels of the data signals corresponding to all the pixel units of the image of a current frame;

calculating differences of the image gray levels between two adjacent ones of the data signals of the pixel units of each of the scan line group in the different scanning sequences; and calculating the driving voltage differences of the data signals of the pixel units in the different scanning sequences based upon a preset formula and the differences of the image gray levels.

In accordance with the driving method for the liquid crystal display panel in the present invention, the two adjacent ones of the data signals are two of the data signals sequentially inputted into the same data line based upon the scanning sequences.

In accordance with the driving method for the liquid crystal display panel in the present invention, the driving voltage differences of the data signals of the pixel units in the different scanning sequences are calculated based upon a maximum of the differences of the image gray levels and the preset formula.

In accordance with the driving method for the liquid crystal display panel in the present invention, the driving voltage differences of the data signals of the pixel units in the different scanning sequences are calculated based upon an average of the differences of the image gray levels and the preset formula.

In accordance with the driving method for the liquid crystal display panel in the present invention, the step of determining the scanning sequence of each of the scan line groups based upon the driving voltage differences of the pixel units of each of the scan line groups in the different scanning sequences and the preset voltage difference, comprises a step of:

comparing the driving voltage difference with the preset voltage difference; and using the scanning sequence corresponding to the driving voltage difference as the scanning sequence of the scan line group if the driving voltage difference is less than the preset voltage difference.

In accordance with the driving method for the liquid crystal display panel in the present invention, the step of determining the scanning sequence of each of the scan line groups based upon the driving voltage differences of the pixel units of each of the scan line groups in the different scanning sequences and the preset voltage difference, comprises a step of:

using a default scanning sequence as the scanning sequence of the scan line group if the driving voltage difference is greater than the preset voltage difference.

In accordance with the driving method for the liquid crystal display panel in the present invention, the default scanning sequence is the scan sequence from top to bottom or from bottom to top.

In accordance with the driving method for the liquid crystal display panel in the present invention, the default scanning sequence is the scanning sequence corresponding to a minimum of the driving voltage differences.

In accordance with the driving method for the liquid crystal display panel in the present invention, each of the scan line groups includes four of the scan lines.

Compared with the conventional driving method for the liquid crystal display panel, the driving method for the liquid crystal display panel in the present invention sets the different scanning sequences based upon the driving voltage differences of data signals to effectively decrease the power consumption of the liquid crystal display panel and solve the technical problem of great power consumption in the conventional driving method for the liquid crystal display panel.

To make the above content of the present invention more comprehensible, preferred embodiments are exemplified with the accompanying drawings, as described in detail below.

DETAILED DESCRIPTION OF THE PREFERRED EMBODIMENTS

Figure 1:
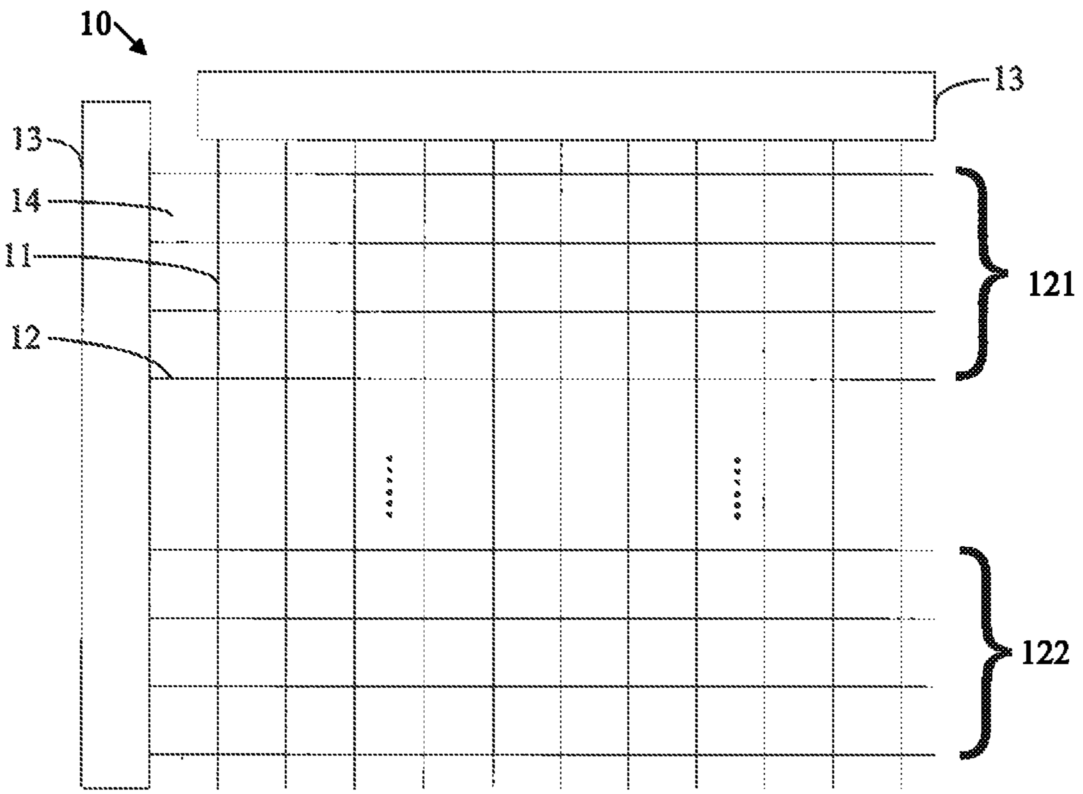
FIG. 1 is a schematic view of a structure of a conventional liquid crystal display panel.

The following description of the embodiments with reference to the accompanying drawings is used to illustrate particular embodiments of the present invention. The directional terms referred in the present invention, such as "upper", "lower", "front", "after", "left", "right", "inner", "outer", "side surface", etc. are only directions with regard to the accompanying drawings. Therefore, the directional terms used for describing and illustrating the present invention are not intended to limit the present invention.

In the drawings, units with similar structures are indicated by the same reference number.

Please refer to FIG. 1. FIG. 1 is a schematic view of a structure of a conventional liquid crystal display panel. The liquid crystal display panel 10 includes data lines 11, scan lines 12, drive chips 13, and pixel units 14. The data lines 11 are used for transmitting data signals, the scan lines 12 are used for transmitting scan signals, the driver chips 13 are used for generating the data signals and the scan signals, and the pixel units 14 are constituted by interlacing the data lines 11 and the scan lines 12, and displaying an image through the data signals and the scan signals.

Figure 2:
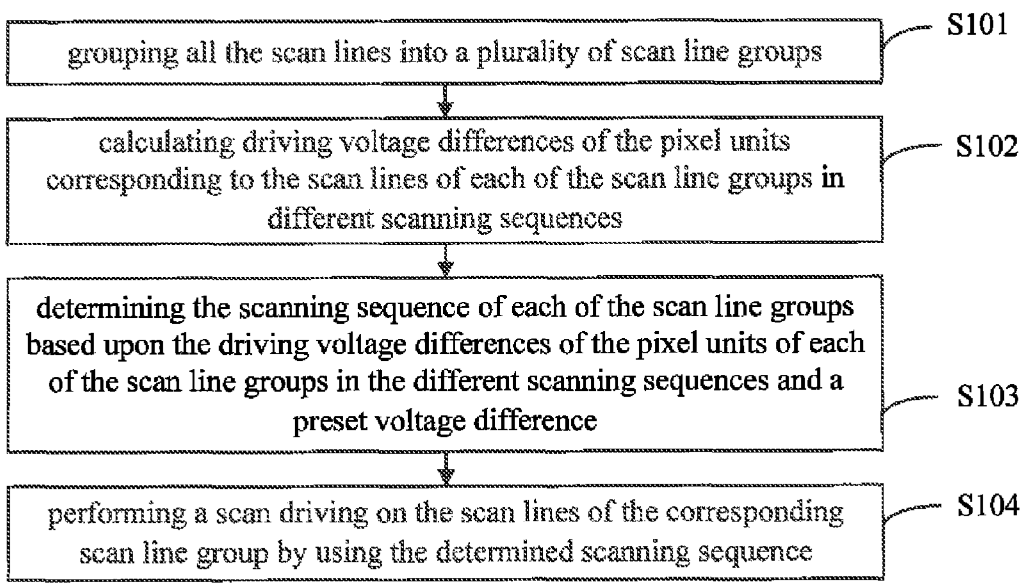
FIG. 2 is a flowchart of a preferred embodiment of a driving method for a liquid crystal display panel in the present invention.

A driving method for the liquid crystal display panel in the present invention can be applied to the above liquid crystal display panel 10. Please refer to FIG. 2. FIG. 2 is a flowchart of a preferred embodiment of the driving method for the liquid crystal display panel in the present invention. The driving method for the liquid crystal display panel comprises the following steps:

In step S101, all the scan lines are grouped to form a plurality of scan line groups.

In step S102, driving voltage differences of the pixel units corresponding to the scan lines of each of the scan line groups in different scanning sequences is calculated.

In step S103, the scanning sequence of each of the scan line groups is determined based upon the driving voltage differences of the pixel units of each of the scan line groups in the different scanning sequences and a preset voltage difference.

In step S104, a scan driving on the scan lines of the corresponding scan line group is performed by using the determined scanning sequence.

The specific process steps of the driving method for the liquid crystal display panel in the preferred embodiment are described in detail as follows.

In step S101, all the scan lines on the liquid crystal display panel 10 are grouped to form the plurality of the scan line groups. Each of the scan line groups includes at least three adjacent scan lines 12, which are specifically shown as the scan line group 121 and the scan line group 122 in FIG. 1.

In the figure, the scan line group 121 and the scan line group 122 include four adjacent scan lines 12. Then the process proceeds to step S102.

Figure 3:
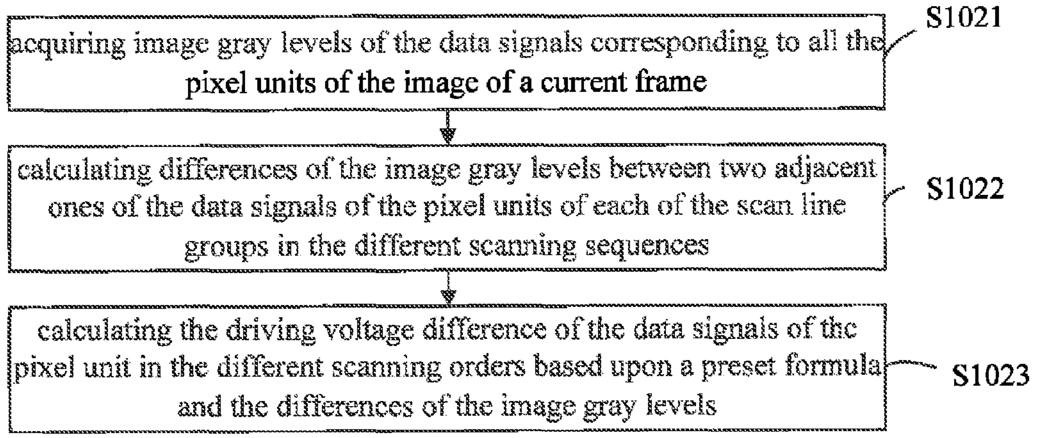
FIG. 3 is a flowchart of step S102 of a driving method for a liquid crystal display panel in the present invention.

In step S102, the driving voltage differences of the pixel units 14 corresponding to the scan lines 12 of each of the scan line groups in the different scanning sequences are calculated. For details, please refer to FIG. 3. FIG. 3 is a flowchart of step S102 of the driving method for the liquid crystal display panel in the present invention. The step S102 comprises the following steps:

In step S1021, the image gray levels of the data signals corresponding to all the pixel units of the image of a current frame are acquired. Then the process proceeds to step S1022.

In step S1022, the differences of the image gray levels between two ones of the adjacent data signals of the pixel units 14 of each of the scan line group in the different scanning sequences are calculated, wherein the two adjacent ones of the data signals are two of the data signals sequentially inputted into the same data line 11 based upon the scanning sequences. Then the process proceeds to step S1023.

In step S1023, the liquid crystal panel 10 calculates the driving voltage differences of the data signals of the pixel units 14 in the different scanning sequences based upon a preset formula and the differences of the image gray levels. Since the power consumption of the drive chip 13 is associated with the driving voltage differences of the data signals, in this step, the image gray level differences are converted into the driving voltage differences by the preset formula for facilitating calculating the power consumption of the driver chip 13. A scan line group includes at least three scan lines 12, so that a scan line group includes at least two image gray level differences. Therefore, the maximum of the plurality of the image gray level differences is converted into the driving voltage difference of the data signals of the pixel units by using the preset formula. Furthermore, the average of the plurality of the image gray level differences is converted into the driving voltage difference of the data signals of the pixel units 14 by using the preset formula. Then the process proceeds to step S103.

Figure 4:
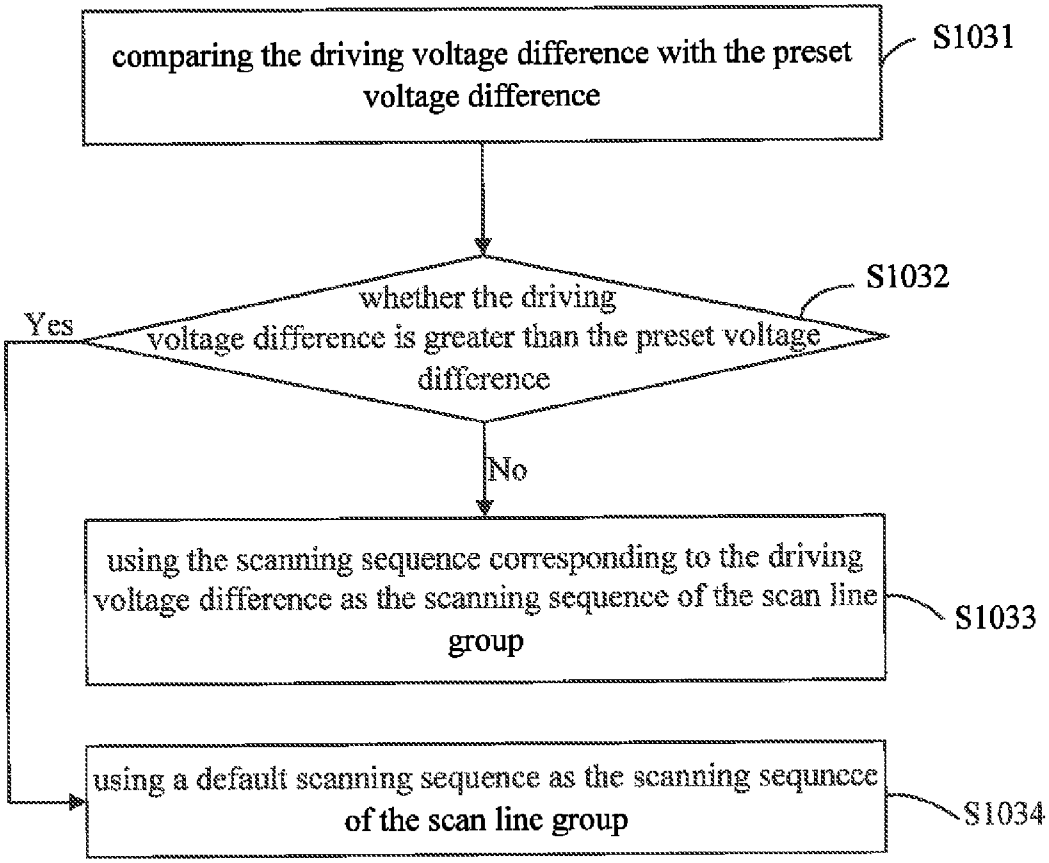
FIG. 4 is a flowchart of step S103 of a driving method for a liquid crystal display panel in the present invention.

In step S103, the liquid crystal display panel determines the scanning sequence of each of the scan line groups based upon the driving voltage difference of the pixel units 14 of each of the scan line groups in the different scanning sequences and the preset voltage difference. For details, please refer to FIG. 4. FIG. 4 is a flowchart of step S103 of the driving method for the liquid crystal display panel in the present invention. The step S103 comprises the following steps:

In step S1031, the driving voltage difference acquired from step S102 is compared with the preset voltage difference.

In step S1032, whether the driving voltage difference is greater than the preset voltage difference is determined. If the driving voltage difference is less than the preset voltage difference, the process proceeds to step S1033. If the driving voltage difference is greater than the preset voltage difference, the process proceeds to step S1034.

In step S1033, since the driving voltage difference is less than or equal to the preset voltage difference, that is, the power consumption of scanning which is preformed by the driver chip 13 in the scanning sequence corresponding the driving voltage difference is less than or equal to the preset power consumption, therefore, the scanning sequence corresponding the driving voltage difference is determined as the scanning sequence of the corresponding scan line group.

In step S1034, since the driving voltage difference is greater than the preset voltage difference, that is, the power consumption of scanning which is preformed by the driver chip 13 in any scanning sequence is greater than the preset power consumption, the default scanning sequence is determined as the scanning sequence of the corresponding scan line group, wherein the default scanning sequence is the scan sequence from top to bottom or from bottom to top, or the scanning sequence corresponding to a minimum of the driving voltage differences, to facilitate the user's operation or to minimize the power consumption of the driver chip 13 as much as possible. Then the process proceeds to step S104.

In step S104, the liquid crystal display panel 10 performs a scan driving on the scan lines 12 of the corresponding scan line group by using the scanning sequence determined in step S103.

These steps complete the driving process of the driving method for the liquid crystal display panel in the present preferred embodiment.

The driving method for the liquid crystal display panel in the present invention sets the different scanning sequences based upon the driving voltage differences of data signals to effectively decrease the power consumption of the liquid crystal display panel.

Figure 5:
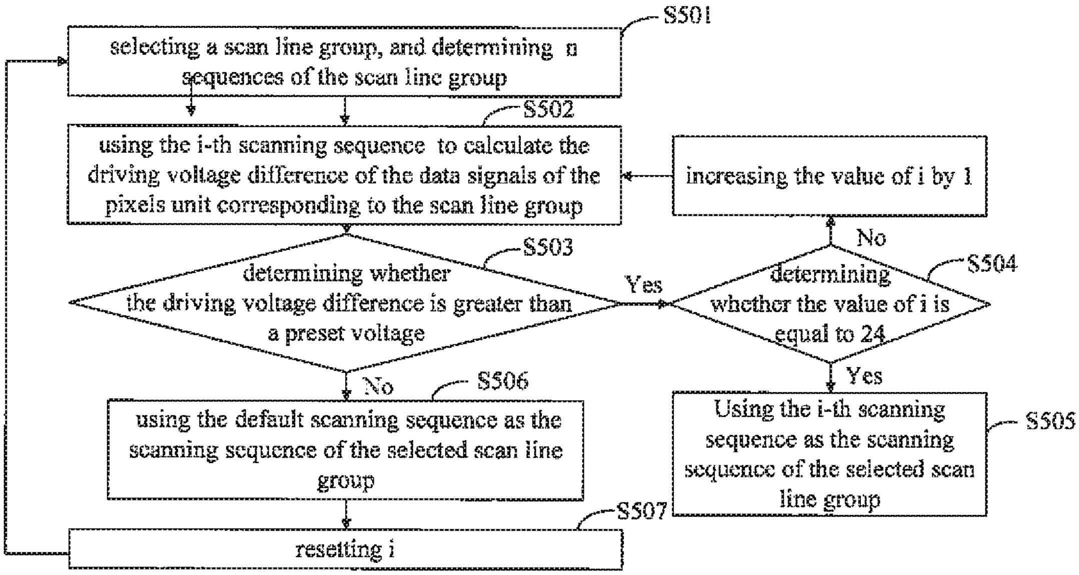
FIG. 5 is a flowchart of a specific embodiment of a driving method for a liquid crystal display panel in the present invention.

By a following specific embodiment, the specific operation principle of the driving method for the liquid crystal display panel in the present invention is illustrated. Please refer to FIG. 5. FIG. 5 is a flowchart of a specific embodiment of a driving method for a liquid crystal display panel in the present invention. This specific embodiment comprises the following steps:

In step S501, a scan line group is selected, n sequences of the scan line group are determined, and n is a positive integer. The scan line group has four scan lines, then n=4!=24.

In step S502, the i-th scanning sequence is used to calculate the driving voltage difference of the data signals of the pixel units corresponding to the scan line group. The initial value of i is 1.

In step S503, whether the driving voltage difference is greater than a preset voltage is determined. If the driving voltage difference is greater, the process proceeds to step S504. If the driving voltage difference is not greater, the process proceeds to step S506.

In step S504, whether the value of i is equal to 24 is determined. If i is equal to 24, the process proceeds to step S505. If i is less than 24, the process proceeds to step S502, and the value of i increases by 1.

In step S505, the default scanning sequence is used as the scanning sequence of the selected scan line group.

In step S506, the i-th scanning sequence is used as the scanning sequence of the selected scan line group.

In step S507, i is reset, and the process returns to step S501 until the scanning sequences of all the scan line groups are determined.

These steps complete the driving process of the driving method for the liquid crystal display panel in the present specific embodiment.

The driving method for the liquid crystal display panel in the present invention sets the different scanning sequences based upon the driving voltage differences of data signals to effectively decrease the power consumption of the liquid crystal display panel and solve the technical problem of great power consumption in the conventional driving method for a liquid crystal display panel.

In summary, although the preferable embodiments of the present invention have been disclosed above, the embodiments are not intended to limit the present invention. A person of ordinary skill in the art, without departing from the spirit and scope of the present invention, can make various modifications and variations. Therefore, the scope of the invention is defined in the claims.

What is claimed is:

1. A driving method for a liquid crystal display panel, the liquid crystal display panel including:

data lines for transmitting data signals;

scan lines for transmitting scan signals;

a driver chip for generating the data signals and the scan signals; and pixel units constituted by interlacing the data lines and the scan lines, and displaying an image through the data signals and the scan signals;

the driving method comprising steps of:

grouping all the scan lines into a plurality of scan line groups, wherein each of the scan line groups includes four of the scan lines;

calculating driving voltage differences of the pixel units corresponding to the scan lines of each of the scan line groups in different scanning sequences;

determining scanning sequence of each of the scan line groups based upon the driving voltage differences of the pixel units of each of the scan line groups in the different scanning sequences and a preset voltage difference;

performing a scan driving on the scan lines of the corresponding scan line group by using the determined scanning sequence, wherein the step of calculating the driving voltage differences of the pixel units corresponding to the scan lines of each of the scan line groups in the different scanning sequences, comprises the steps of:

acquiring image gray levels of the data signals corresponding to all the pixel units of the image of a current frame;

calculating differences of the image gray levels between two adjacent ones of the data signals of the pixel units of each of the scan line groups in the different scanning sequences; and calculating the driving voltage differences of the data signals of the pixel units in the different scanning sequences based upon a preset formula and the differences of the image gray levels.

2. The driving method for the liquid crystal display panel as claimed in claim 1, wherein the two adjacent ones of the data signals are two of the data signals sequentially inputted into the same data line based upon the scanning sequence.

3. The driving method for the liquid crystal display panel as claimed in claim 1, wherein the driving voltage differences of the data signals of the pixel units in the different scanning sequences are calculated based upon a maximum of the differences of the image gray levels and the preset formula.

4. The driving method for the liquid crystal display panel as claimed in claim 1, wherein the driving voltage differences of the data signals of the pixel units in the different scanning sequences are calculated based upon an average of the differences of the image gray levels and the preset formula.

5. The driving method for the liquid crystal display panel as claimed in claim 1, wherein the step of determining the scanning sequence of each of the scan line groups based upon the driving voltage differences of the pixel units of each of the scan line groups in the different scanning sequences and the preset voltage difference, comprises a step of:

comparing the driving voltage difference with the preset voltage difference; and using the scanning sequence corresponding to the driving voltage difference as the scanning sequence of the scan line group if the driving voltage difference is less than the preset voltage difference.

6. The driving method for the liquid crystal display panel as claimed in claim 5, wherein the step of determining the scanning sequence of each of the scan line groups based upon the driving voltage differences of the pixel units of each of the scan line groups in the different scanning sequences and the preset voltage difference, comprises a step of:

using a default scanning sequence as the scanning sequence of the scan line group if the driving voltage difference is greater than the preset voltage difference.

7. The driving method for the liquid crystal display panel as claimed in claim 6, wherein the default scanning sequence is a scan sequence from top to bottom or from bottom to top.

8. The driving method for the liquid crystal display panel as claimed in claim 6, wherein the default scanning sequence is the scanning sequence corresponding to a minimum of the driving voltage differences.

9. A driving method for a liquid crystal display panel, the liquid crystal display panel including:

data lines for transmitting data signals;

scan lines for transmitting scan signals;

a driver chip for generating the data signals and the scan signals; and pixel units constituted by interlacing the data lines and the scan lines, and displaying an image through the data signals and the scan signals;

the driving method comprising steps of:

grouping all the scan lines into a plurality of scan line groups, wherein each of the scan line groups includes at least three of the scan lines;

calculating driving voltage differences of the pixel units corresponding to the scan lines of each of the scan line groups in the different scanning sequences;

determining scanning sequence of each of the scan line groups based upon the driving voltage differences of the pixel units of each of the scan line groups in the different scanning sequences and a preset voltage difference;

performing a scan driving on the scan lines of the corresponding scan line group by using the determined scanning sequence.

10. The driving method for the liquid crystal display panel as claimed in claim 9, wherein the step of calculating the driving voltage differences of the pixel units corresponding to the scan lines of each of the scan line groups in the different scanning sequences, comprises the steps of:

acquiring image gray levels of the data signals corresponding to all the pixel units of the image of a current frame;

calculating differences of the image gray levels between two adjacent ones of the data signals of the pixel units of each of the scan line group in the different scanning sequences; and calculating the driving voltage differences of the data signals of the pixel units in the different scanning sequences based upon a preset formula and the differences of the image gray levels.

11. The driving method for the liquid crystal display panel as claimed in claim 10, wherein the two adjacent ones of the data signals are two of the data signals sequentially inputted into the same data line based upon the scanning sequences.

12. The driving method for the liquid crystal display panel as claimed in claim 10, wherein the driving voltage differences of the data signals of the pixel units in the different scanning sequences is calculated based upon a maximum of the differences of the image gray levels and the preset formula.

13. The driving method for the liquid crystal display panel as claimed in claim 10, wherein the driving voltage differences of the data signals of the pixel units in the different scanning sequences is calculated based upon an average of the differences of the image gray levels and the preset formula.

14. The driving method for the liquid crystal display panel as claimed in claim 10, wherein the step of determining the scanning sequence of each of the scan line groups based upon the driving voltage differences of the pixel units of each of the scan line groups in the different scanning sequences and the preset voltage difference, comprises a step of:

comparing the driving voltage difference with the preset voltage difference; and using the scanning sequence corresponding to the driving voltage difference as the scanning sequence of the scan line group if the driving voltage difference is less than the preset voltage difference.

15. The driving method for the liquid crystal display panel as claimed in claim 14, wherein the step of determining the scanning sequence of each of the scan line groups based upon the driving voltage differences of the pixel units of each of the scan line groups in the different scanning sequences and the preset voltage difference, comprises a step of:

using a default scanning sequence as the scanning sequence of the scan line group if the driving voltage difference is greater than the preset voltage difference.

16. The driving method for the liquid crystal display panel as claimed in claim 15, wherein the default scanning sequence is the scan sequence from top to bottom or from bottom to top.

17. The driving method for the liquid crystal display panel as claimed in claim 15, wherein the default scanning sequence is the scanning sequence corresponding to a minimum of the driving voltage differences.

18. The driving method for the liquid crystal display panel as claimed in claim 15, wherein each of the scan line groups includes four of the scan lines.

* * * * *